(12) United States Patent
Littfin

(10) Patent No.: US 12,528,203 B2
(45) Date of Patent: Jan. 20, 2026

(54) END OF ARM ATTACHMENT FOR A ROBOTIC ARM

(71) Applicant: ENTEGRIS, INC., Billerica, MA (US)

(72) Inventor: Jacob Littfin, Young America, MN (US)

(73) Assignee: ENTEGRIS, INC., Billerica, MA (US)

( * ) Notice: Subject to any disclaimer, the term of this patent is extended or adjusted under 35 U.S.C. 154(b) by 131 days.

(21) Appl. No.: 18/199,807

(22) Filed: May 19, 2023

(65) Prior Publication Data

US 2023/0373103 A1 Nov. 23, 2023

Related U.S. Application Data

(60) Provisional application No. 63/344,474, filed on May 20, 2022.

(51) Int. Cl.
| | |
|---|---|
| *B25J 15/04* | (2006.01) |
| *B25J 9/16* | (2006.01) |
| *B25J 11/00* | (2006.01) |
| *B25J 13/08* | (2006.01) |
| *B25J 15/00* | (2006.01) |
| *B25J 15/02* | (2006.01) |
| *B25J 19/02* | (2006.01) |
| *B67D 7/02* | (2010.01) |

(52) U.S. Cl.
CPC ......... *B25J 15/0408* (2013.01); *B25J 11/005* (2013.01); *B25J 15/0019* (2013.01); *B25J 15/02* (2013.01); *B25J 19/023* (2013.01)

(58) Field of Classification Search
CPC .. B25J 15/0408; B25J 11/005; B25J 15/0019; B25J 15/02; B25J 19/023; B25J 15/04; B25J 9/1697; B25J 13/08; B67D 7/0288
See application file for complete search history.

(56) References Cited

U.S. PATENT DOCUMENTS

| | | | |
|---|---|---|---|
| 11,136,150 B1 | 10/2021 | Seiver et al. | |
| 12,070,852 B2 * | 8/2024 | Iwasaki | B25J 15/08 |
| 2006/0243755 A1 * | 11/2006 | Hennen | B67D 7/0294 |
| | | | 222/464.1 |
| 2014/0212556 A1 * | 7/2014 | Larzul | A47J 31/407 |
| | | | 99/295 |

(Continued)

FOREIGN PATENT DOCUMENTS

| | | |
|---|---|---|
| JP | 2003534996 A | 11/2003 |
| KR | 101625186 B1 | 5/2016 |

(Continued)

*Primary Examiner* — Harry Y Oh

(57) ABSTRACT

An apparatus comprises: a robotic arm and an end-of-arm attachment fixedly attached to the robotic arm, where the end-of-arm attachment comprises: a fixed portion of the end-of-arm attachment fixedly attached to the robotic arm which is adapted to receive exchangeable portions of the end-of-arm attachment; a first exchangeable portion of the end-of-arm attachment adapted to remove a cap from a container, retain the cap, and reinstall the cap on the container; and a second exchangeable portion of the end-of-arm attachment adapted to install a dispense head on the container and remove the dispense head from the container, where the dispense head is capable of dispensing a liquid-based material from the container. Methods of using the apparatus are provided.

20 Claims, 15 Drawing Sheets

(56) References Cited

U.S. PATENT DOCUMENTS

| | | | |
|---|---|---|---|
| 2018/0238923 A1* | 8/2018 | Abe | B25J 9/1679 |
| 2018/0272543 A1* | 9/2018 | Kayama | B25J 9/1687 |
| 2019/0344293 A1* | 11/2019 | Knott | B05B 12/004 |
| 2019/0378740 A1* | 12/2019 | Isokawa | H01L 21/67196 |
| 2020/0055194 A1* | 2/2020 | Kamon | G06F 3/011 |
| 2022/0280968 A1* | 9/2022 | Hickmott | B05C 5/0225 |
| 2023/0067742 A1* | 3/2023 | Kalouche | B25J 15/0666 |

FOREIGN PATENT DOCUMENTS

| | | |
|---|---|---|
| KR | 20170017957 A | 2/2017 |
| KR | 20200107370 A | 9/2020 |
| KR | 20220020745 A | 2/2022 |

* cited by examiner

END OF ARM ATTACHMENT FOR A ROBOTIC ARM

FIELD OF THE DISCLOSURE

This disclosure relates to automated dispensing of liquids such as the high purity, highly corrosive liquids used in semiconductor processing and chemical manufacturing from containers.

BACKGROUND OF THE DISCLOSURE

High purity and highly corrosive liquids are often utilized in industries such as semiconductor processing and chemical manufacturing. Due to quality and safety concerns, these liquids generally must be contained in high integrity containers and dispensed using highly reliable dispensing systems.

Conventionally, the containers are drums formed of high purity polyethylene, such as those described in U.S. Pat. No. 6,045,000. Examples of dispensing systems suitable for use with these drums are described in U.S. Pat. Nos. 4,699,298, 5,108,015, 5,957,328, and 5,526,956. The connections, tubing, and fittings for handling these fluids are often formed from inert materials, such as various fluoropolymers. The tubing is commonly formed of Per Fluor Alkoxy ("PFA), while the fittings and valve components can be formed of components such as PFA, Poly Tetra Fluoro Ethylene ("PTFE), and other various fluoropolymers.

Conventional drums often include a bung opening and a drum insert connected to an upward and concentric nipple on the bung. A dispense head can be operably coupled with the drum insert and can include a main fluid passageway that connects to and sealingly engages the bung. The dispense head may additionally include a recirculation passageway such that the fluid that is dispensed from the drum can later be recirculated to the drum.

When using dispense heads to draw high purity, highly corrosive, and highly caustic liquids from drums, it can be important not to connect a dispense head for equipment requiring one type of liquid to a drum containing an incorrect or incompatible different liquid. To inhibit this, coded indexing sections and recesses have been provided in the dispense head and drum insert to enable assembly of the drum insert to the dispense head only when the correct coding exists.

One such dispensing system, the Sentry QCIII Quick Connect System™, is depicted in FIGS. 1A & 1B. Drum 10 has two bungs 20, one of which is occupied by threaded plug 25. Mounted in the second bung 20 is drum insert 30. Drum insert 30 includes bung threading 31 for engagement with bung 20 of drum 10. Drum insert 30 includes cap threading 32 for engagement with shipping cap 40 (depicted as removed and set aside in FIG. 1A). Down tube 33 may be used to withdraw the contents of drum 10. A second, coaxial recirculation channel formed in the volume between down tube 33 and recirculation down tube 34 opens at deflector 35, and may be used for recirculation of dispensed fluid to drum 10. Shipping cap 40 may be color-coded to identify the contents of drum 10.

Dispense head 50 engages with drum insert 30 by rotation of locking ring 51 for dispensing of the contents of drum 10. When engaged, dispense head 50 provides communication between tubing 52 and drum 10 for purposes of withdrawing the contents of drum 10, recirculating withdrawn fluid to drum 10, venting drum 10, and verifying the establishment of a tight seal among dispense head 50, drum insert 30, and bung 20 of drum 10.

Installation of dispense head 50 is accomplished by hand, with the use of a purpose-designed torque wrench.

SUMMARY OF THE DISCLOSURE

The present disclosure provides apparatus and methods for automated dispensing of potentially hazardous liquid-based materials from drums which may provide greater accuracy, speed, repeatability, and safety. From removing a shipping cap to installing a dispense head to ultimately reinstalling the shipping cap, all open-port operations on the drum (as well as all dispense operations) may be performed within an enclosure with no personnel present within the enclosure.

Briefly, the present disclosure provides an apparatus comprising: a. a robotic arm; and b. an end-of-arm attachment fixedly attached to the robotic arm, where the end-of-arm attachment comprises: i. a fixed portion of the end-of-arm attachment fixedly attached to the robotic arm which is adapted to receive exchangeable portions of the end-of-arm attachment; ii. a first exchangeable portion of the end-of-arm attachment adapted to remove a cap from a container, retain the cap, and reinstall the cap on the container; and iii. a second exchangeable portion of the end-of-arm attachment adapted to install a dispense head on the container and remove the dispense head from the container, wherein the dispense head is capable of dispensing a liquid-based material from the container. In some embodiments, the liquid-based material is a Chemical and Mechanical Polishing (CMP) process chemical and the CMP process chemical is dispensed to a CMP process tool. In some embodiments, the apparatus includes a programmable logic controller which controls the motion of the robotic arm and the end-of-arm attachment elements and optionally coordinates the actions of the apparatus with those of the CMP process tool. Additional embodiments of the apparatus of the present disclosure are described below.

In another aspect, the present disclosure provides a method for automated dispensing of liquid-based materials from a container, comprising: a. providing an apparatus for automated filling or dispensing of liquid-based materials from a container the apparatus comprising: i. a robotic arm; and ii. an end-of-arm attachment fixedly attached to the robotic arm, wherein the end-of-arm attachment comprises: 1. a fixed portion of the end-of-arm attachment fixedly attached to the robotic arm; the fixed portion being adapted to receive exchangeable portions of the end-of-arm attachment; 2. a first exchangeable portion of the end-of-arm attachment adapted to remove a cap from the container, retain the cap, and reinstall the cap on the container; and 3. a second exchangeable portion of the end-of-arm attachment adapted to install a dispense head on the container and remove the dispense head from the container; b. with the first exchangeable portion attached to the fixed portion, removing a cap from the container with the first exchangeable portion; and c. with the second exchangeable portion attached to the fixed portion, installing a dispense head on the container. In some embodiments, the method additionally comprises: d. dispensing a liquid-based material from the container through the dispense head. In some embodiments, the method further comprises: e. supplying a portion of the liquid-based material to a CMP process tool; and f. recirculating a portion of the liquid-based material back into the container through the dispense head. Additional embodiments of the method of the present disclosure are described below.

The preceding summary of the present disclosure is not intended to describe each embodiment of the present invention. The details of one or more embodiments of the invention are also set forth in the description below. Other features, objects, and advantages of the invention will be apparent from the description and from the claims.

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open-ended sense, and generally mean "including, but not limited to." It will be understood that the terms "consisting of" and "consisting essentially of" are subsumed in the term "comprising," and the like.

DETAILED DESCRIPTION

Figure 1A:
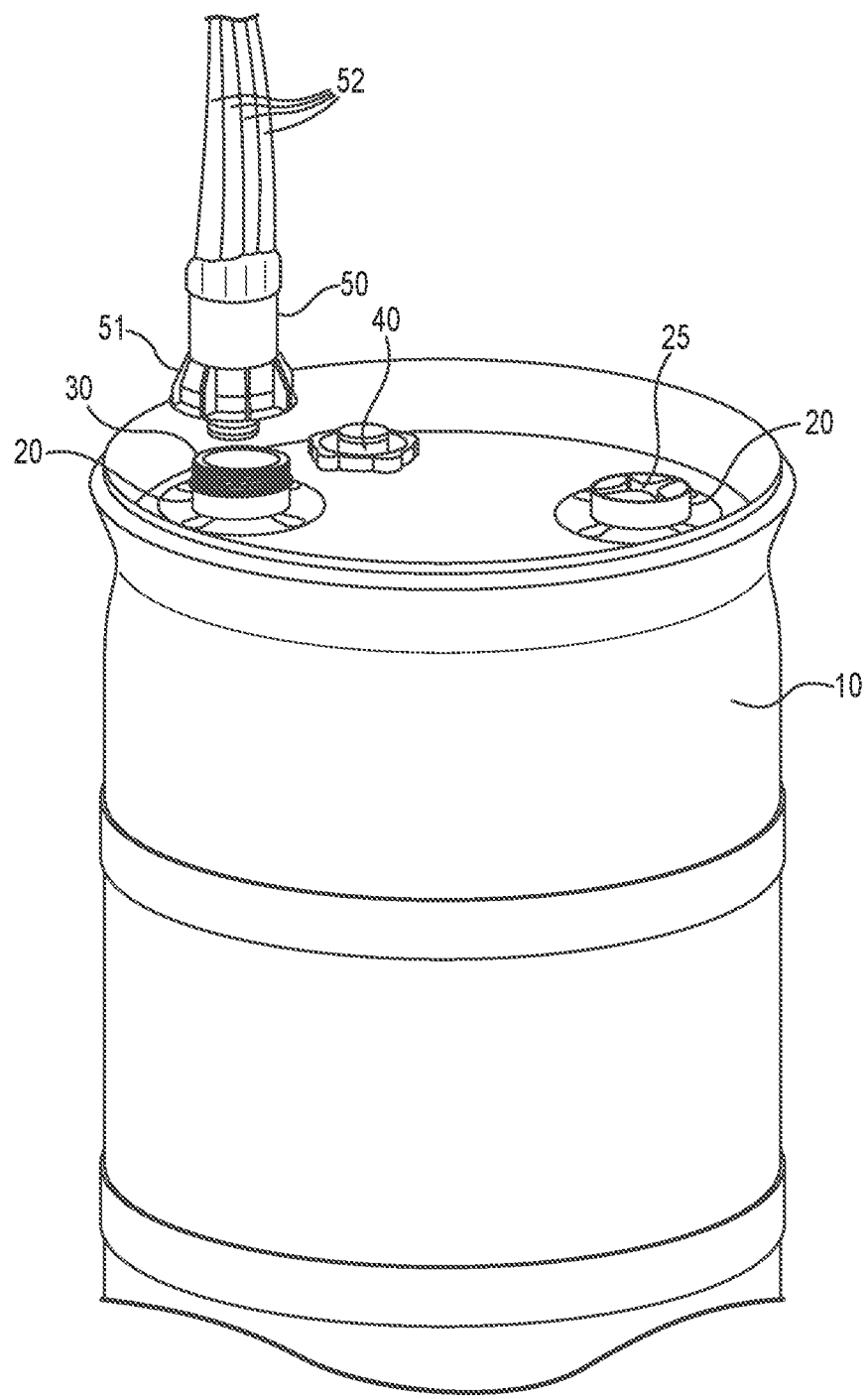
FIG. 1A is a photograph of a prior art, manually applied apparatus for dispensing liquids from a drum.
Figure 1B:
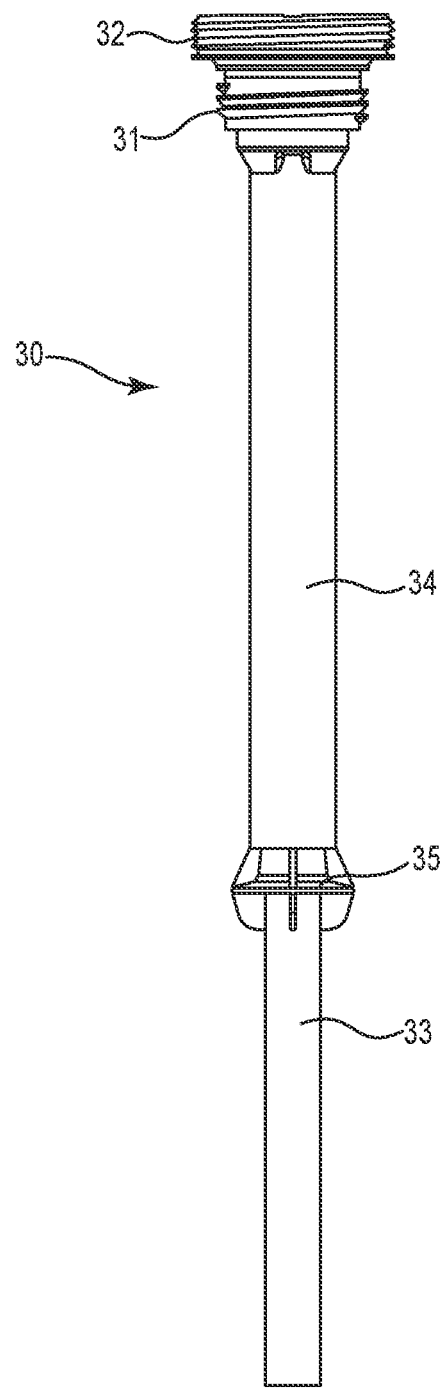
FIG. 1B is an elevational view of a drum insert used in the prior art apparatus of FIG. 1A.

The present disclosure provides end of arm tooling which may be mounted on a robotic arm. The tooling includes a first piece which is attached to the arm and a second piece which is removably attached to the first piece. The first piece includes one or more pneumatic controlled locks which interact with the second piece. The first piece may include one or more pins, guides, grooves, etc. for guiding the connection between the first piece and the second piece. The first piece includes a servo drive adapter to provide torque to a portion of the second piece. The first piece may include a sensor. In an embodiment, the sensor may measure the torque applied with the servo drive adapter. The sensor may measure the rotation of the servo drive adapter.

The first piece serves as a universal head for interfacing with a variety of second pieces configured to work with different drum designs or perform different operations on a drum. For example, the second piece may be designed to remove or place a shipping cap in the drum. The second piece may be a drumhead component configured to facilitate filling or emptying a drum. The second pieces may be mounted in the cell of the robot for rapid exchange. This may allow a robotic arm to perform a wider variety of tasks than if the end of arm tooling lacked this rapid exchange feature.

The use of one or more guide pins may enhance the ability of the robot arm to exchange second pieces. The guide pins may include a tapered tip and/or may be received into a hole with a conical opening. Similarly, grooves, bumps, divots, guides, etc. may be used to facilitate automated alignment between the first piece and the second piece. In one embodiment, the first piece includes two guide pins to engage holes in the second piece. In an embodiment, the first piece includes guide pins mounted near the outer edge of the first piece. In another embodiment, the first piece includes guide pins mounted near the servo drive adapter. In some embodiments, the guide pins are located on the first piece and holes to receive the guide pins are located on the second piece. In other embodiments, the guide pins are part of the second piece and the first piece includes the holes to receive the guide pins. In yet other embodiments, both the first piece and second piece include both a guide pin and a hole to receive a guide pin.

The first piece includes one or more pneumatically controlled locks. The pneumatically controlled locks facilitate temporary attachment between the first piece and the second piece. The pneumatically controlled locks are configured to stay locked in the event of loss of pressure to the pneumatically controlled locks. Similarly, the pneumatically controlled locks are configured to stay locked in the event of loss of power to the system. This helps assure that the second piece will stay attached to the first piece in the event of power failure or loss of pneumatic pressure.

The first piece includes one or more servo drive adapters. The servo drive adaptor may include a rotating wheel with a number of fingers extending away from the wheel and away from the first piece. The fingers serve to interlock with a receiving component on the second piece and allow transfer of rotation to the receiving component. In an embodiment, the rotating wheel includes three fingers of equal size. However, different numbers of fingers may be used. In some embodiments, the figures include different size fingers or gaps between fingers. In some embodiments, the fingers and gaps are of equal size, for example, alternating 60-degree arcs around the rotating wheel. For four fingers, 45-degree arcs may be used.

The first piece may further comprise one or more cameras. In an embodiment, the first piece comprises two cameras. The cameras may perform port identification, port location, shipping cap configuration & drum insert key code verification. The camera vision system capability may eliminate the hassle of needing to maintain perfect drum placement on a pallet after fill. Color images with high pixel resolutions enable greater quality and safety with additional automated inspection, e.g., reading product ID tags or keycodes on drum inserts. The camera may include deep learning software.

The first piece may include a port to connect to a programmable logic controller (PLC). In an example, the PLC controls operation of the servo drive adaptor and/or pneumatically controlled locks.

In some embodiments, the end of arm tooling of the first and second pieces is part of an automation cell including a robot arm. The automation cell may include framing designed to allow the complete automation cell to be fully moveable by forklift while maintaining integrity of sensitive equipment. The automation cell may run on a single air and power supply connection. This ensures fast installation times with minimally invasive infrastructure needs. The automation cell footprint may allow for expansion or addition of process steps, e.g., drumhead flush station, test equipment.

Figure 2A:
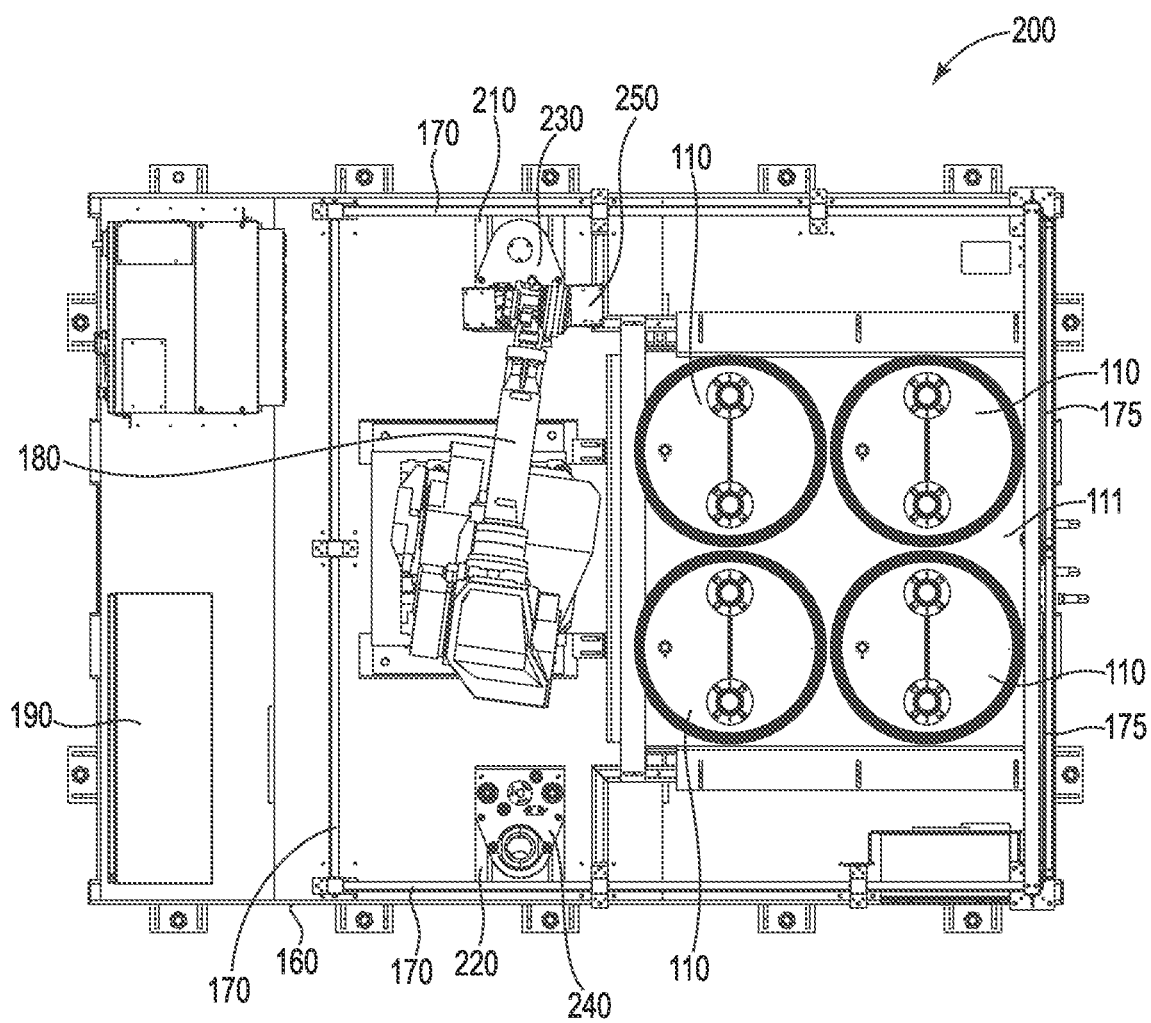
FIG. 2A is a plan view of an apparatus according to the present disclosure.
Figure 2B:
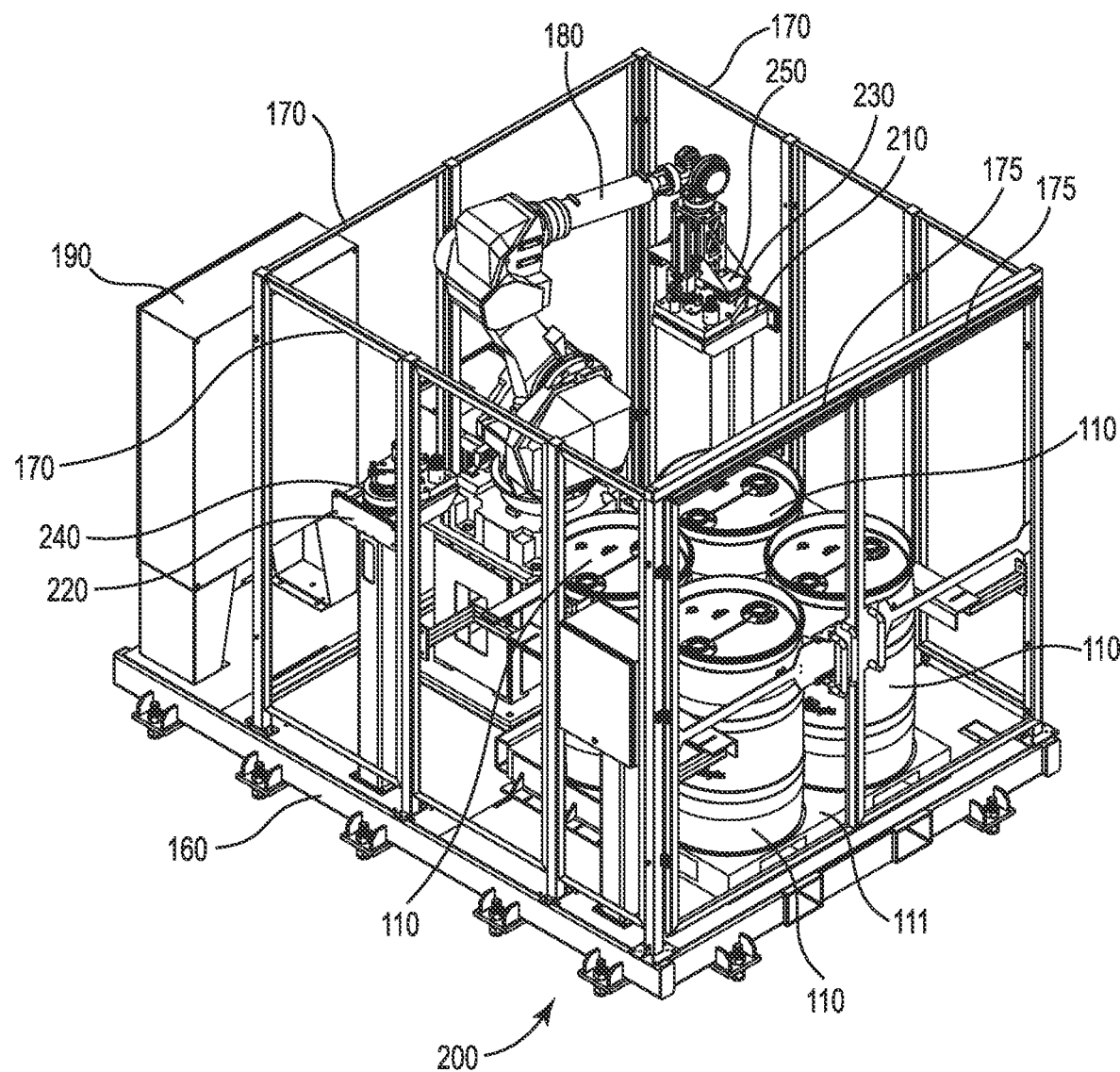
FIG. 2B is an elevational view of an apparatus according to the present disclosure.

FIGS. 2A & 2B depict one embodiment of an apparatus according to the present disclosure. The apparatus may be mounted on base 160 such that the entire apparatus forms a cell 200 that is fully moveable (i.e., via forklift) while maintaining the integrity of sensitive equipment. Cell 200 may be designed to run on a single air and power supply connection. This ensures fast installation times with minimally invasive infrastructure needs. Typical power supply needs may include three-phase electric 380-575V typically 480V power supply capable of 2.5 kW power consumption. Transformers can be added for different plant power available in different regions. Typical air supply needs may include 550 to 690 kPa (80-100 PSI) for operation of pneumatic components. Cell 200 may additionally include containment walls 170, including doors 175. To provide safe operation, door safety interlocks may be included to prevent operation of components when doors are open. The footprint of cell 200 may allow expansion or addition of process steps, e.g., a dispense head flush station, test equipment, and the like.

One or more drums 110, which may be borne on pallet 111, may be placed within cell 200 and doors 175 closed. Drums 110 may contain any suitable liquid; however, the apparatus is especially suitable for high purity, highly corrosive, and/or highly caustic liquids such as utilized in industries such as semiconductor processing and chemical manufacturing.

The apparatus includes robot arm 180. Programable logic controller 190, adapted and connected to control the motion of robot arm 180 and optionally additional functions, may be an integral part of cell 200. Robot arm 180 may be a FANUC Foundry PRO M-710iC/50 robot arm, which features protection against dust ingress and immersion, chemical vapor resistant epoxy paint, 6 axis movement, 50 kg payload capacity and 2050 mm of reach. Programable logic controller 190 may be an Allen Bradley Programable Logic Control with AB PanelView HMI touchscreen, local network connect capacity, remote access capacity for technical support, and pin output options for communication with existing CDU systems for a total closed loop process. Mounted at the end of robot arm 180 is universal head (UH) 250. UH 250 is the first piece of the end of arm tooling of the present disclosure. It is equipped to engage with and operate multiple second pieces of the end of arm tooling, including shipping cap end-of-arm tool (SC EOAT) 230 and dispense head end-of-arm tool (DH EOAT) 240. Robot arm 180 is capable of reaching SC EOAT docking station 210, DH EOAT docking station 220, and drums 110. As depicted, SC EOAT docking station 210 bears SC EOAT 230. As depicted, DH EOAT docking station 220 bears DH EOAT 240.

Figure 3A:
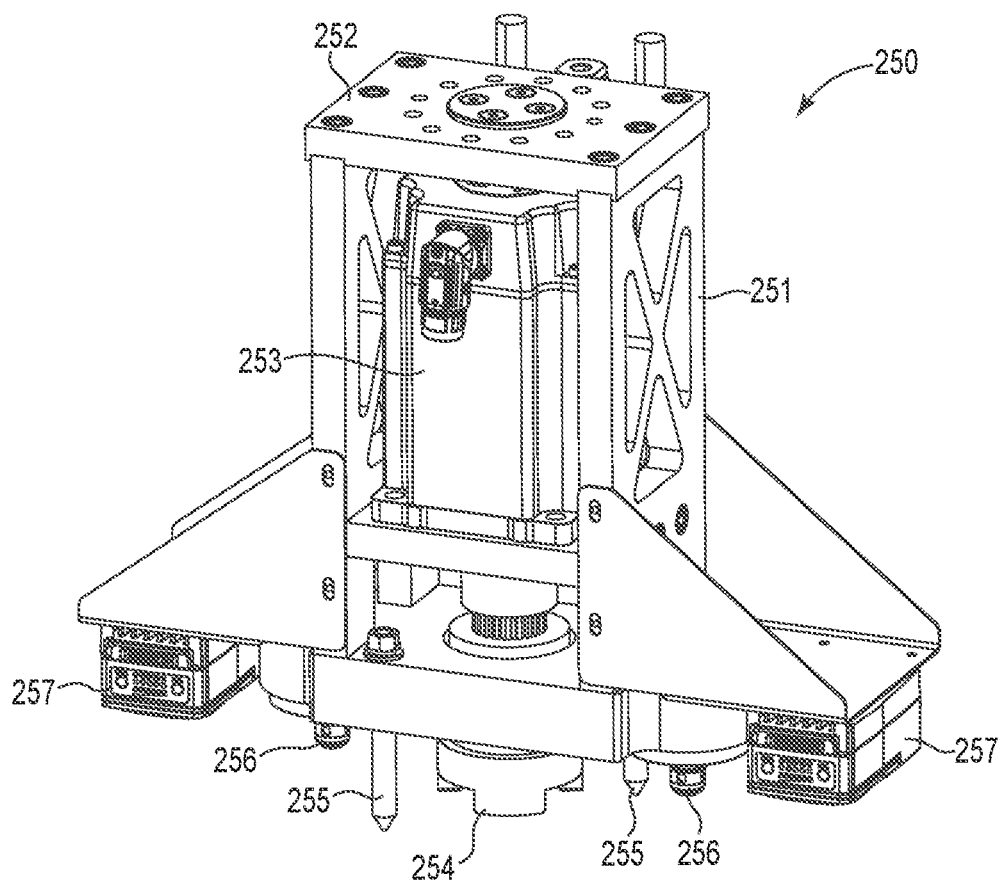
FIG. 3A is an elevation view of a universal head according to the present disclosure.
Figure 3B:
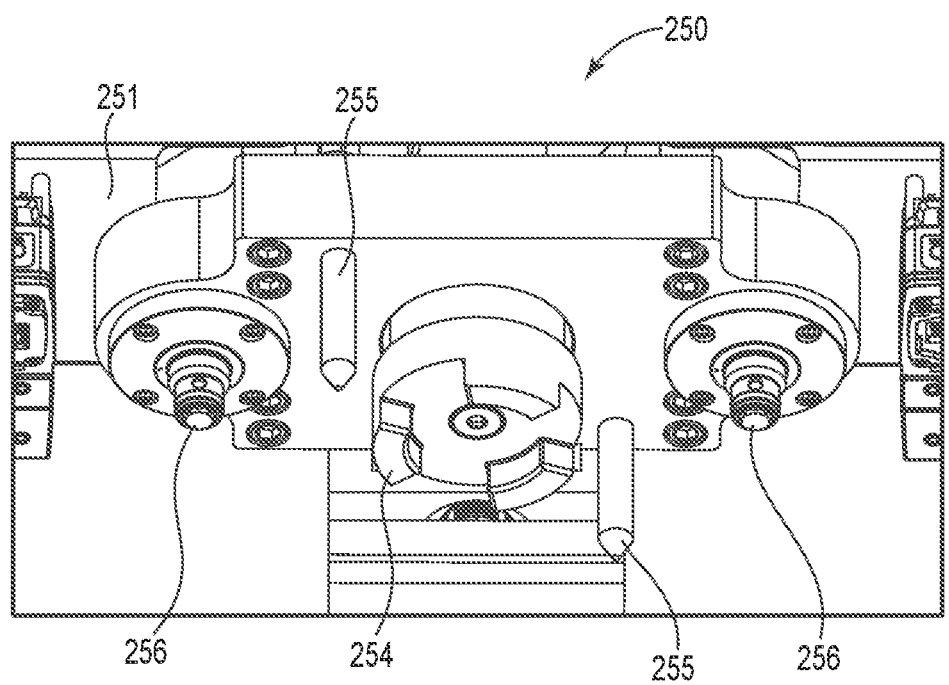
FIG. 3B is an elevational view of details of the underside of a universal head according to the present disclosure.

FIGS. 3A & 3B depict universal head (UH) 250 in greater detail. UH 250 is the first piece of the end of arm tooling of the present disclosure. UH 250 comprises chassis 251 which bears the other components of UH 250. Chassis 251 includes top plate 252 which is adapted to be attached to the end of robot arm 180, either permanently (e.g., by welding, adhesive, rivets, or the like) or semi-permanently (e.g., by machine bolts or the like). Servo motor 253 is configured to drive servo drive adapter 254. When engaged with the SC EOAT or the DH EOAT, servo drive adapter 254 may provide torque to moving elements of those second pieces. Servo motor 253 may be equipped to accommodate monitoring of torque, rotation, speed and position (including starting and ending points of rotation). Guide pins 255 engage complementary portions of the SC EOAT or the DH EOAT to guide attachment of those second pieces and provide stability when attached. Locks 256 engage complementary portions of the SC EOAT or the DH EOAT to lock the second pieces to the UH when engaged. Locks 256 may be pneumatically actuated. Locks 256 may be biased to a locked position such that a loss of power (or pneumatic pressure) to the locks will not cause the locks to open and release an engaged second piece. UH 250 may additionally comprise a vision system including one or both cameras 257. The vision system may be a high-resolution color system such that it may be used for port identification, port location determination, shipping cap identification, and drum insert identification. Additionally, UH 250 may comprise a laser range finding instrument in or adjacent to one or both cameras 257.

Figure 4:
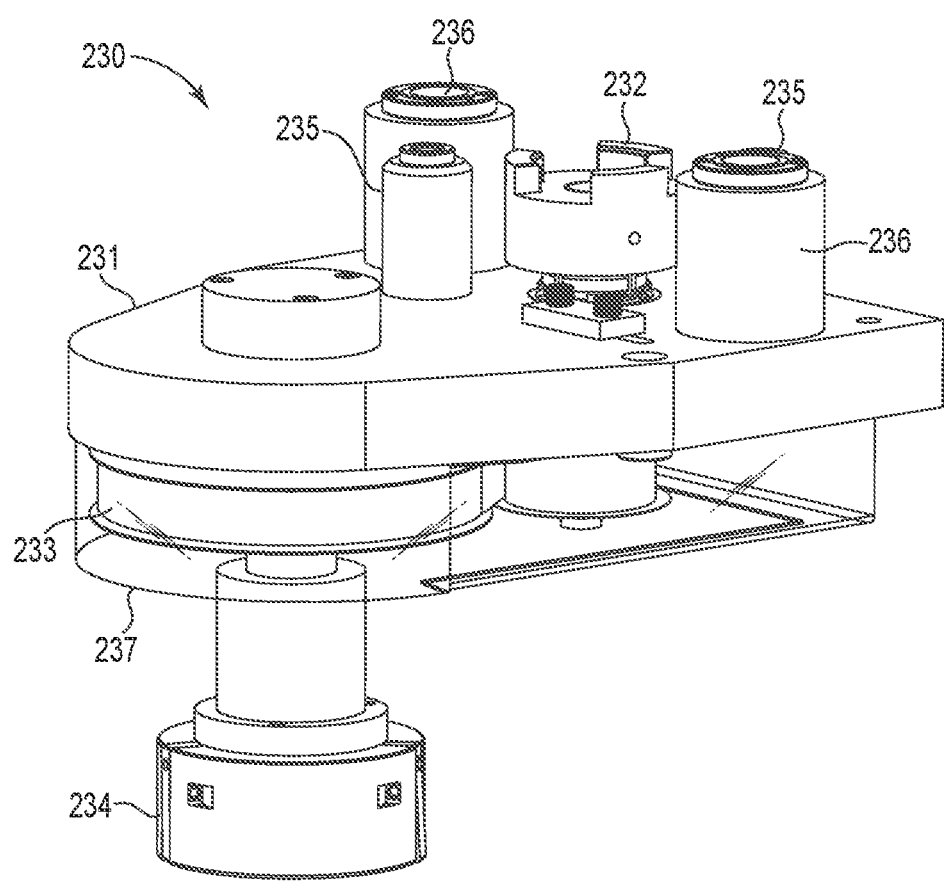
FIG. 4 is an elevational view of a shipping cap end-of-arm tool according to the present disclosure.

FIG. 4 depicts shipping cap end-of-arm tool (SC EOAT) 230. SC EOAT 230 is a second piece of the end of arm tooling of the present disclosure. SC EOAT 230 comprises chassis 231 which bears the other components of SC EOAT 230. Servo drive receiver 232 is configured to engage with servo drive adapter 254 of UH 250 such that torque is transferred from servo motor 253 of UH 250 to servo drive receiver 232. Belt and pully system 233 transfers torque to shipping cap rotor 234. Shipping cap rotor 234 is capable of engaging and holding a shipping cap of a drum. Shipping cap rotor 234 may comprise active or passive clamp elements (not shown) positioned within shipping cap rotor 234 such that they may work in concert to hold a cap. In a passive embodiment, two, three, or more clamp elements are positioned within shipping cap rotor 234. One or more clamp elements are spring loaded such that pressing shipping cap rotor 234 over a cap causes spring loaded clamp elements to deflect to an open position and then return to a cap holding position over the cap. In an active embodiment, clamp elements are opened and closed by powered actuators such as servos. Pin receivers 235 engage guide pins 255 of UH 250 to guide attachment of SC EOAT 230 with UH 250 and provide stability when attached. Lock receivers 236 engage locks 256 of UH 250 to lock SC EOAT 230 with UH 250 when engaged. Guard 237 encloses belt and pully system 233 to prevent contamination of the workspace from that drive system. When not attached to UH 250, SC EOAT 230 is kept in SC EOAT docking station 210. In use, robot arm 180 maneuvers UH 250 into position over SC EOAT docking station 210 to engage or release SC EOAT 230.

Figure 5:
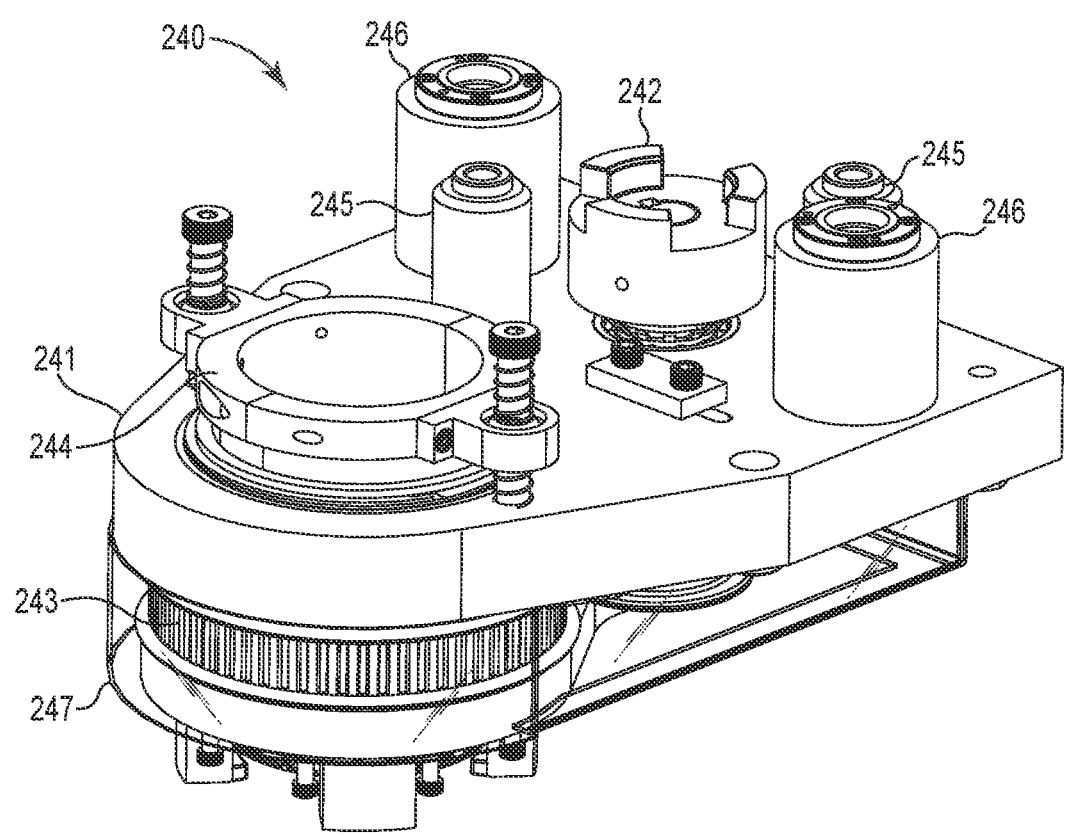
FIG. 5 is an elevational view of a dispense head end-of-arm tool according to the present disclosure.

FIG. 5 depicts dispense head end-of-arm tool (DH EOAT) 240. DH EOAT 240 is a second piece of the end of arm tooling of the present disclosure. DH EOAT 240 comprises chassis 241 which bears the other components of DH EOAT

240. Servo drive receiver 242 is configured to engage with servo drive adapter 254 of UH 250 such that torque is transferred from servo motor 253 of UH 250 to servo drive receiver 242. Belt and pully system 243 transfers torque to dispense head rotor 244. Dispense head rotor 244 is capable of holding a dispense head (not shown), and more specifically the locking ring of a dispense head, for attachment to the drum insert of a drum. Dispense head rotor 244 may be fitted with a standard dispense head such as dispense head 50 of FIG. 1A. Pin receivers 245 engage guide pins 255 of UH 250 to guide attachment of DH EOAT 240 with UH 250 and provide stability when attached. Lock receivers 246 engage locks 256 of UH 250 to lock DH EOAT 240 with UH 250 when engaged. Guard 247 encloses belt and pully system 243 to prevent contamination of the workspace from that drive system. When not attached to UH 250, DH EOAT 240 is kept in DH EOAT docking station 220. In use, robot arm 180 maneuvers UH 250 into position over DH EOAT docking station 220 to engage or release DH EOAT 240.

The method according to the present invention may include some or all of the following actions, which are described below in greater detail.

1. Drum(s) are conveyed into the cell.
2. With proper positioning of the vision system by the robot arm, the vision system is used to identify port openings of the drum(s) and confirm the correct choice of drum by shipping cap type and/or other markings.
3. With proper positioning of the laser range finding instrument by the robot arm, the laser range finding instrument is used determine a plane of the shipping cap orthogonal to the axis of rotation of the shipping cap.
4. The robot arm engages the SC EOAT resting in the SC EOAT docking station and uses the SC EOAT to unscrew the shipping cap from the drum insert of the drum by rotating the cap about its axis of rotation. The robot arm returns the SC EOAT to the SC EOAT docking station and disengages, with the shipping cap remaining held in the shipping cap rotor of the SC EOAT.
5. The robot arm engages the DH EOAT resting in the DH EOAT docking station.
6. With proper positioning of the vision system by the robot arm, the vision system is used to identify the drum insert and confirm the correct choice of drum and compatibility of the dispense head with the drum insert.
7. The robot arm aligns the dispense head with the axis of rotation of the shipping cap and engages the locking ring of the dispense head with the drum insert.
8. The DH EOAT is used to turn the locking ring of the dispense head to engage the dispense head with the drum insert at the proper torque, which is monitored.
9. After the contents of the drum are dispensed, the DH EOAT is used to turn the locking ring of the dispense head to disengage the dispense head from the drum insert.
10. The robot arm returns the DH EOAT to the DH EOAT docking station, engages the SC EOAT resting in the SC EOAT docking station, and uses the SC EOAT to reinstall the shipping cap at the proper torque, which is monitored.

Figure 6:
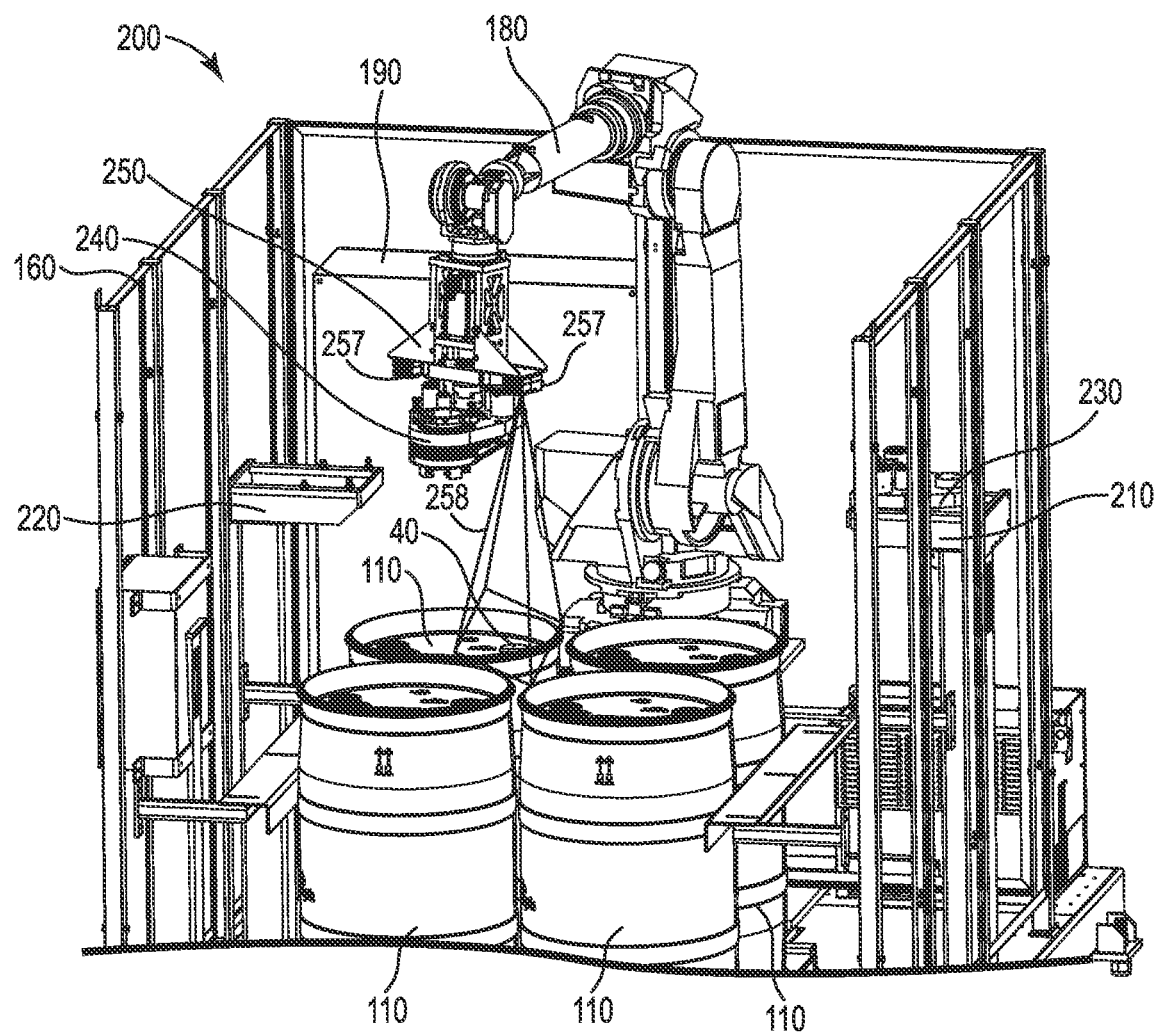
FIG. 6 is an elevational view of an apparatus according to the present disclosure in operation.

With reference to FIG. 6, robot arm 180 positions the cameras 257 of the vision system over drum 110 such that a field of vision 258 includes shipping cap 40. The vision system is used to identify each port opening of the drums. (The apparatus is depicted with UH 250 engaged with and carrying DH EOAT 240 without a dispense head mounted in it.) The correct choice of drum is confirmed by shipping cap type and/or other markings. The location of the shipping cap in the XY plane is determined.

Figure 7:
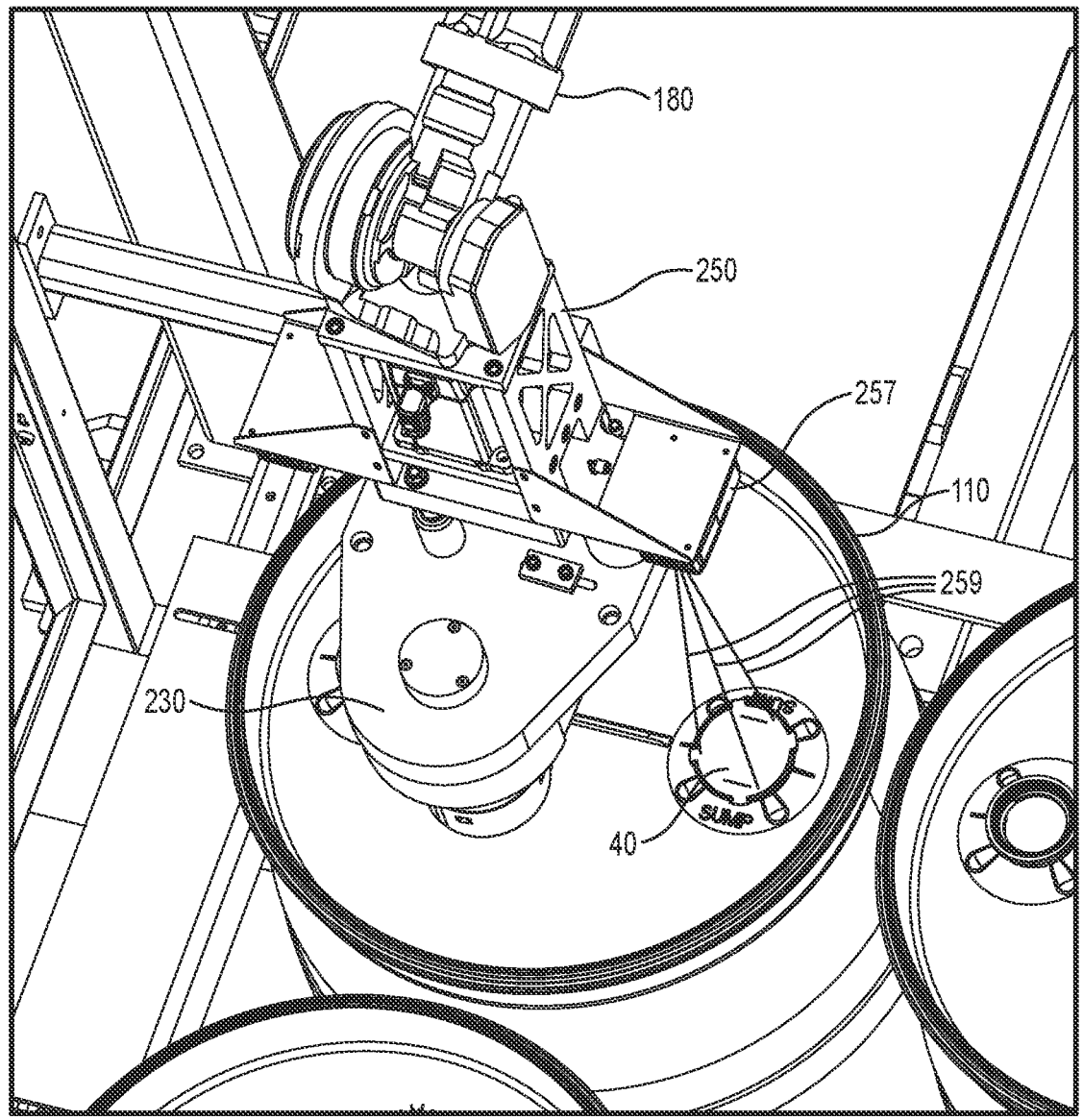
FIG. 7 is an elevational view of an apparatus according to the present disclosure in operation.

With reference to FIG. 7, robot arm 180 positions the laser range finding instrument adjacent to camera 257 of the vision system over drums 110 such that it may measure distance to locations on shipping cap 40. (The apparatus is depicted with UH 250 engaged with and carrying SC EOAT 230.) The laser range finding instrument takes measurements at a minimum of three locations 259. Using these 3 (or more) data points, a reference plane in which the port is aligned is determined, which is a plane orthogonal to the axis of rotation of the shipping cap. In subsequent operations, robot arm 180 is oriented such that the axis of rotation of the SC EOAT and DH EOAT tools is aligned with the axis of rotation of the shipping cap, thereby preventing cross-threading or undue friction.

Figure 8:
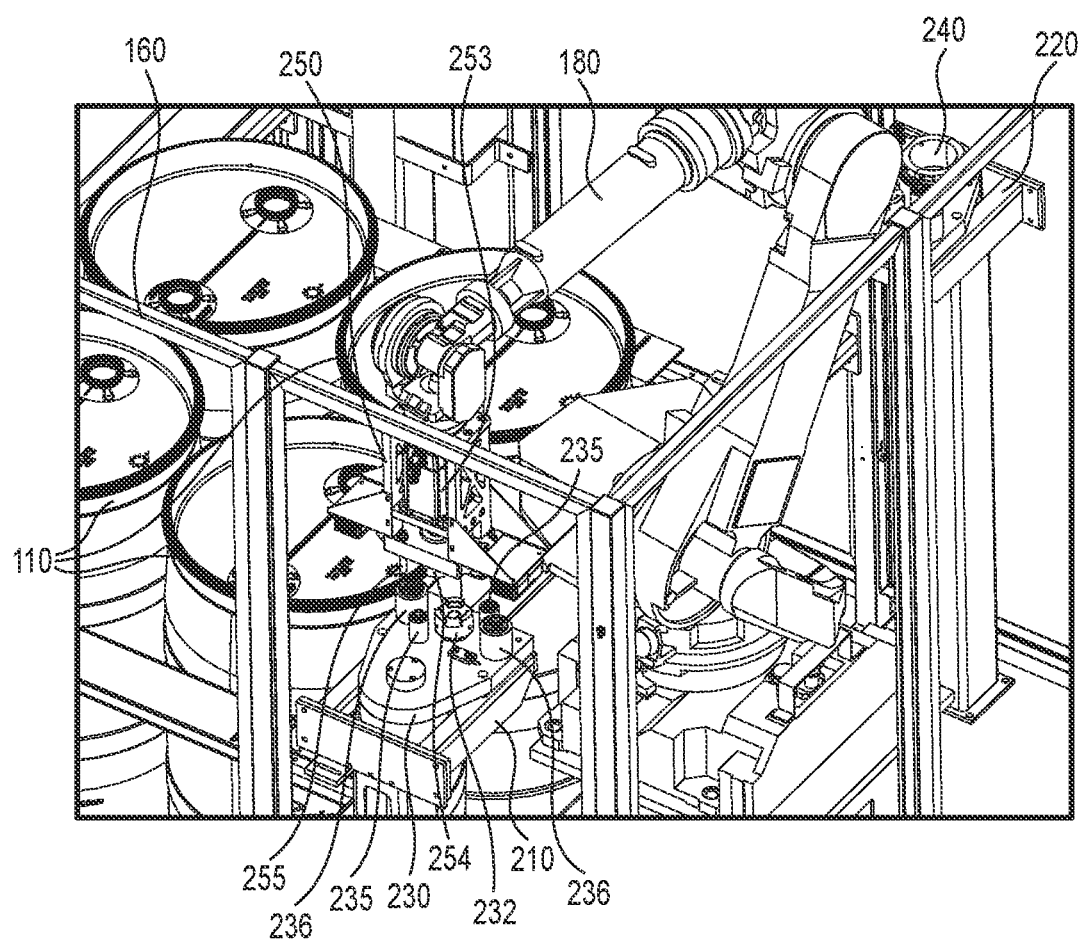
FIG. 8 is an elevational view of an apparatus according to the present disclosure in operation.

FIG. 8 depicts the operation of robot arm 180 such that UH 250 may engage SC EOAT 230 for use. SC EOAT 230 rests on SC EOAT docking station 210. Robot arm 180 positions UH 250 directly above SC EOAT 230 such that guide pins 255 (one of two is visible) of UH 250 are in alignment with pin receivers 235 of SC EOAT 230 and locks 256 of UH 250 are in alignment with lock receivers 236 of SC EOAT 230. Robot arm 180 lowers UH 250 onto SC EOAT 230 such that servo drive adapter 254 engages servo drive receiver 232. Locks 256 are engaged to secure SC EOAT 230 to UH 250 for use. In the opposite operation, to return and disengage the SC EOAT, robot arm 180 positions SC EOAT 230 on SC EOAT docking station 210 and locks 256 are disengaged. Engagement and disengagement of DH EOAT 240 is carried out by essentially the same methods.

Figure 9A:
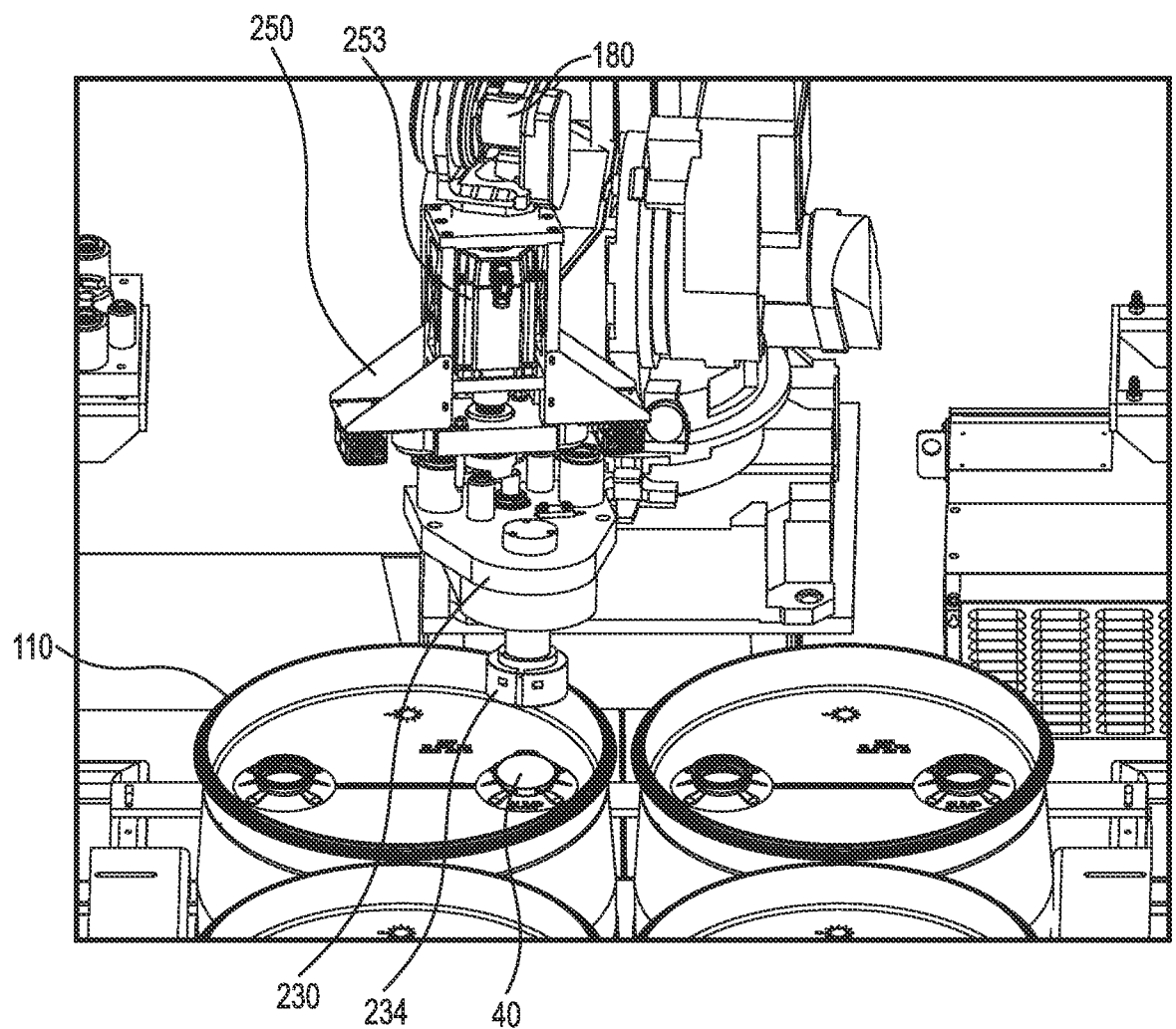
FIG. 9A is an elevational view of an apparatus according to the present disclosure in operation.
Figure 9B:
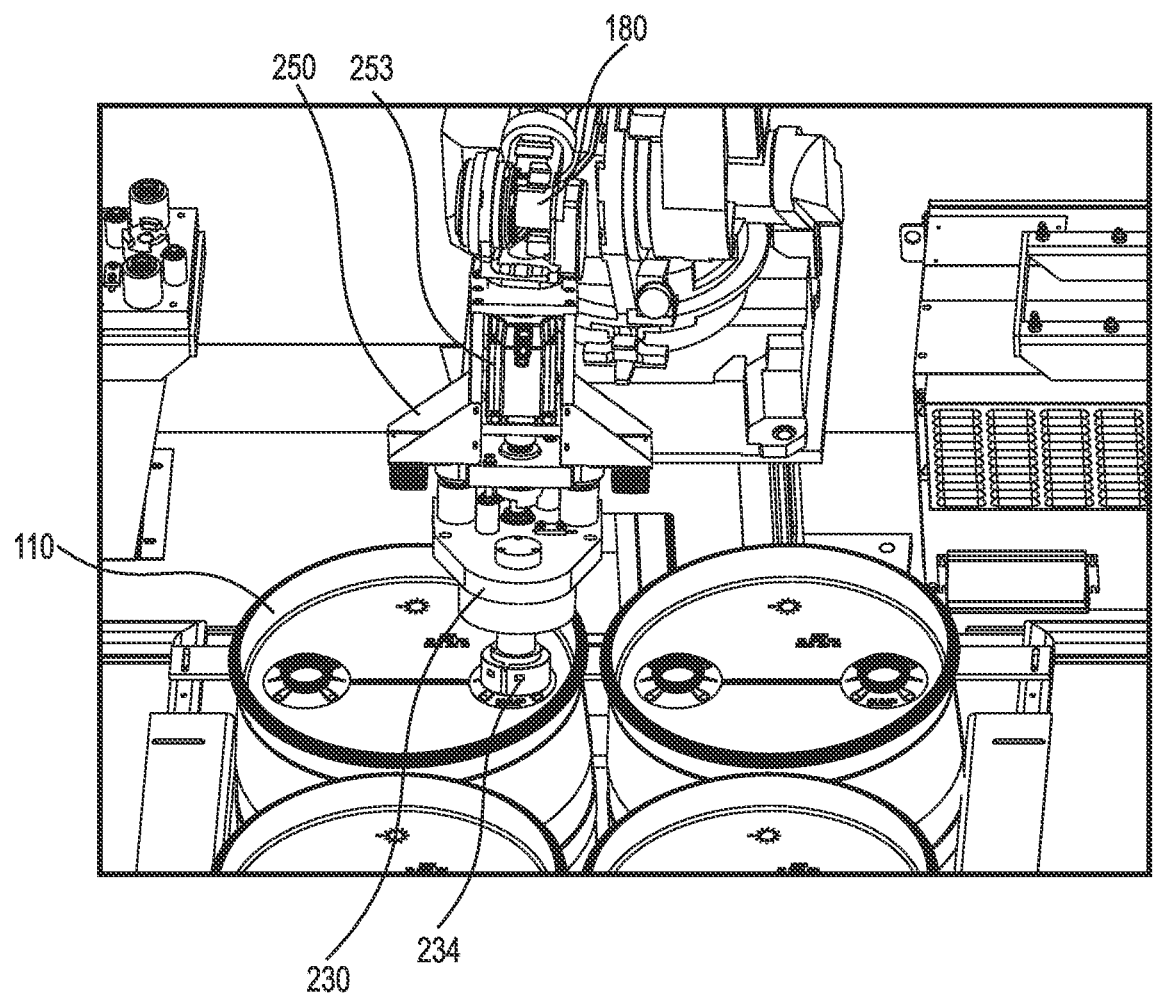
FIG. 9B is an elevational view of an apparatus according to the present disclosure in operation.

FIGS. 9A & 9B depict the operation of robot arm 180 with SC EOAT 230 engaged to UH 250 to remove shipping cap 40 from drum 110. Robot arm 180 positions SC EOAT 230 such that shipping cap rotor 234 is above the previously determined location of the shipping cap in the XY plane, and such that the axis of rotation of shipping cap rotor 234 is aligned with the previously determined axis of rotation of the shipping cap. Robot arm 180 lowers SC EOAT 230 over the shipping cap such that shipping cap rotor 234 engages the shipping cap. Servo motor 253 turns shipping cap rotor 234 (typically counter-clockwise) to disengage the shipping cap, exposing the drum insert. The shipping cap is held in shipping cap rotor 234 until such time as it is reinstalled on drum 110. Reinstallation of the shipping cap again involves positioning SC EOAT 230 such that shipping cap rotor 234 is above the previously determined location of the shipping cap (when installed) in the XY plane, and such that the axis of rotation of shipping cap rotor 234 is aligned with the previously determined axis of rotation of the shipping cap (when installed). Robot arm 180 lowers SC EOAT 230 over the drum insert such that the shipping cap held in shipping cap rotor 234 engages the drum insert. Servo motor 253 turns shipping cap rotor 234 (typically clockwise) to engage the shipping cap with the drum insert, while rotational position and torque are monitored to assure proper sealing of the reinstalled shipping cap.

Figure 10:
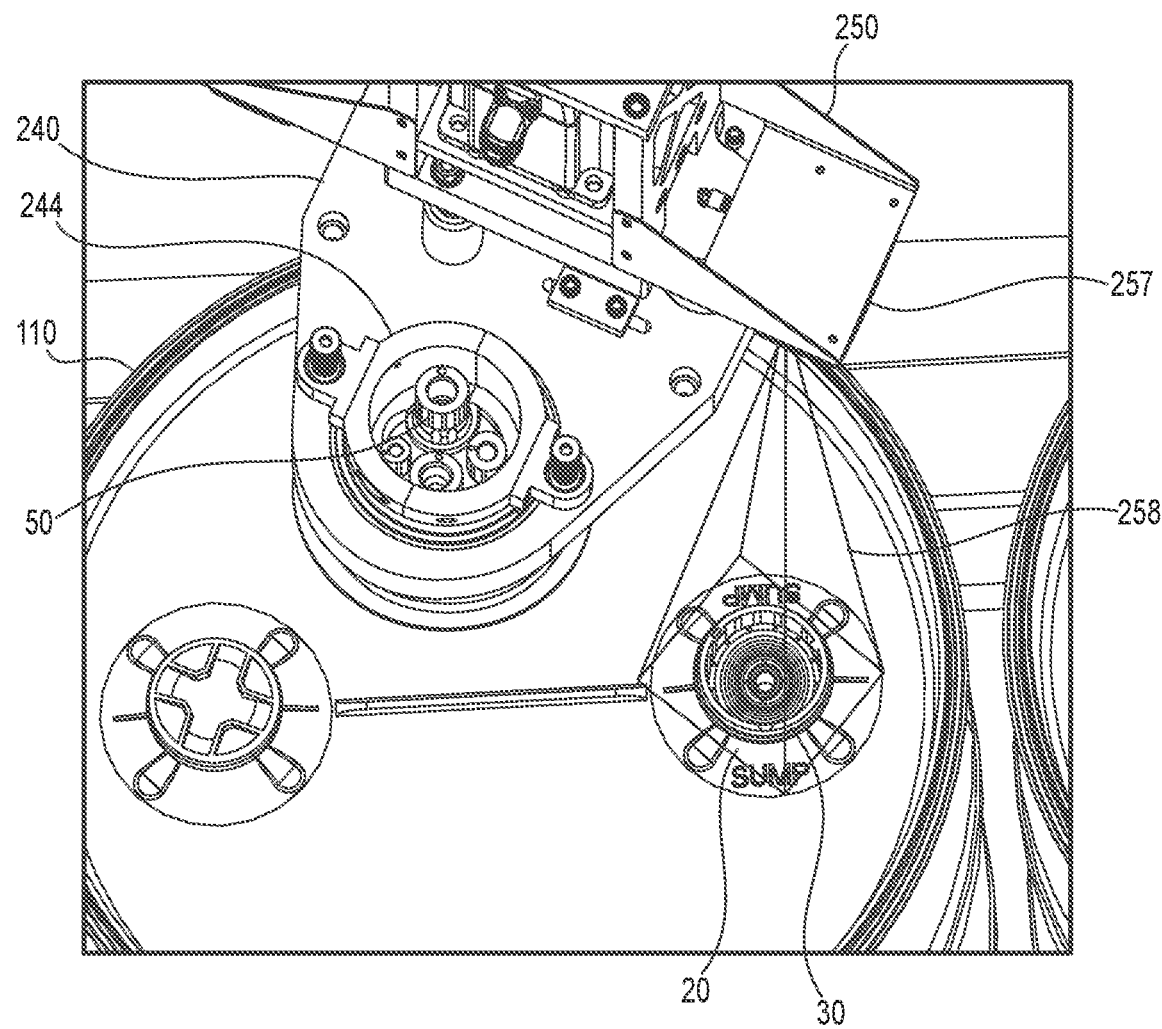
FIG. 10 is an elevational view of an apparatus according to the present disclosure in operation.

With reference to FIG. 10, removal of the shipping cap exposes drum insert 30 mounted in bung 20 of drum 110. After removal of the shipping cap, robot arm 180 returns the SC EOAT to the SC EOAT docking station with the shipping cap held in the shipping cap rotor of the SC OEAT and engages UH 250 with DH EOAT 240 at the DH EOAT docking station. DH EOAT 240 includes dispense head 50 mounted in dispense head rotor 244, which holds dispense head 50 by the locking ring of dispense head 50, not visible in this view. (Tubing connected to dispense head 50 is omitted from this view for clarity.) Prior to installing dispense head 50 on drum insert 30, the apparatus uses the vision system to verify the proper drum insert 30, as depicted in FIG. 10. Robot arm 180 positions camera 257 of the vision system over drum 110 such that a field of vision 258 includes drum insert 30 for confirmation of the proper drum insert 30.

Figure 11:
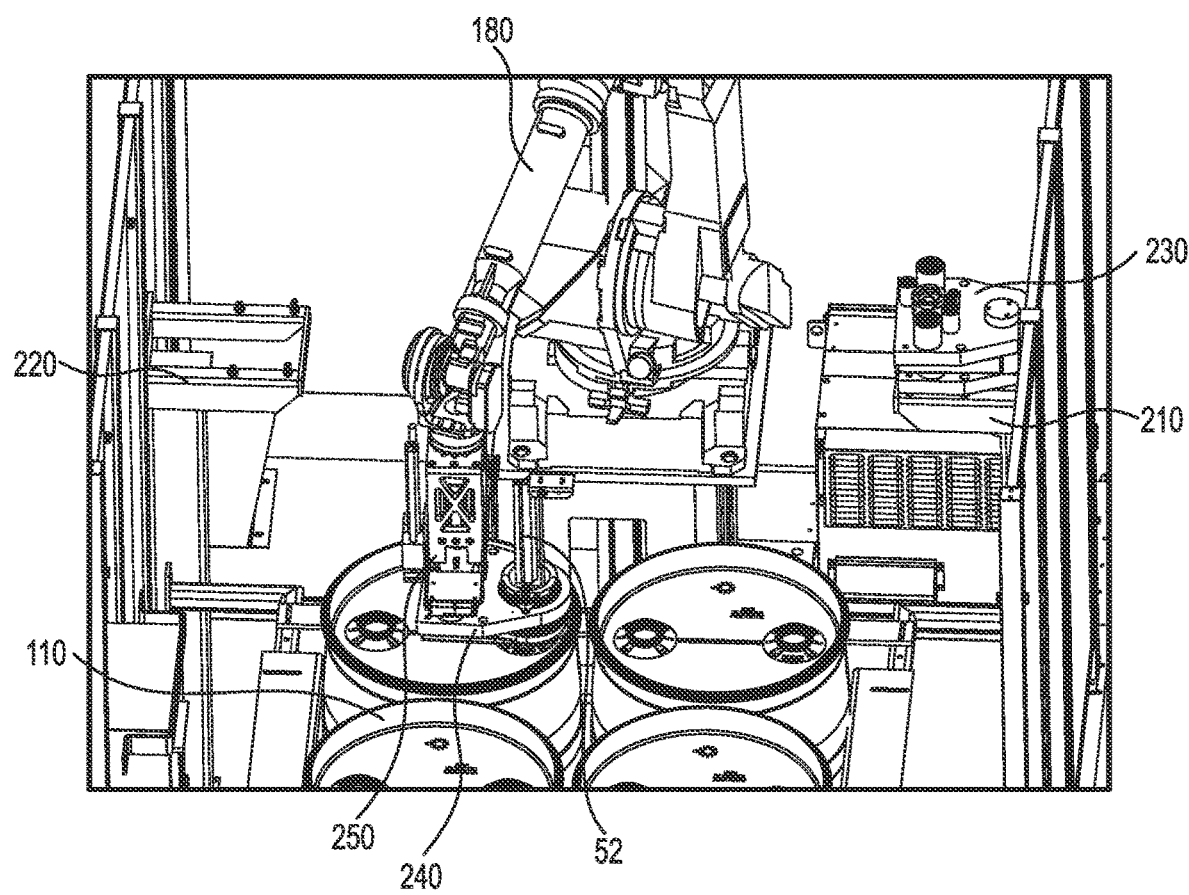
FIG. 11 is an elevational view of an apparatus according to the present disclosure in operation.

With additional reference to FIG. 11, if the correct drum insert 30 is present, robot arm 180 then positions DH EOAT 240 such that dispense head rotor 244 is above the previously determined location of drum insert 30 in the XY plane (previously determined as the location of the shipping cap), and such that the axis of rotation of dispense head rotor 244 is aligned with the previously determined axis of rotation for drum insert 30 (previously determined as the axis of rotation of the shipping cap). Robot arm 180 lowers DH EOAT 240 over the drum insert such that the locking ring of dispense head 50 held in dispense head rotor 244 engages the drum insert. The servo motor of UH 250 turns dispense head rotor 244 (typically clockwise) to engage the locking ring of dispense head 50 with drum insert 30, while rotational position and torque are monitored to assure proper sealing of dispense head 50. In addition, proper connection may be verified by use of a verification port of dispense head 50 where that feature is included. Robot arm 180 remains in position during dispensing of the contents of drum 110 through tubing 52 connected to the dispense head. Tubing 52 is depicted as truncated in FIG. 11. Tubing 52 forms connections for withdrawing the contents of drum 110, recirculating withdrawn fluid to drum 110, and venting drum 110, in addition to (as noted above) verifying the establishment of a tight seal among dispense head 50, drum insert 30, and bung 20 of drum 110.

After dispensing is complete, the servo motor of UH 250 turns dispense head rotor 244 (typically counter-clockwise) to disengage the locking ring of dispense head 50 from drum insert 30. As described above, robot arm 180 then returns DH EOAT 240 to DH EOAT docking station 220, retrieves SC EOAT 230 (which hold the shipping cap) from SC EOAT docking station 210, and reinstalls the shipping cap.

Various modifications and alterations of this disclosure will become apparent to those skilled in the art without departing from the scope and principles of this disclosure, and it should be understood that this disclosure is not to be unduly limited to the illustrative embodiments set forth hereinabove.

I claim:

1. An apparatus comprising:
   a robotic arm; and
   an end-of-arm attachment fixedly attached to the robotic arm, wherein the end-of-arm attachment comprises:
      a fixed portion of the end-of-arm attachment fixedly attached to the robotic arm, the fixed portion comprising a universal head with a chassis, a servo motor, a servo drive adapter, guide pins, and locks; the fixed portion being adapted to receive exchangeable portions of the end-of-arm attachment;
      in a first configuration, a first exchangeable portion of the end-of-arm attachment adapted to remove a cap from a container, retain the cap, and reinstall the cap on the container, the first exchangeable portion comprising a shipping cap end-of-arm tool with a chassis, a servo drive receiver, a belt and pulley system, and a shipping cap rotor; and
      in a second configuration, a second exchangeable portion of the end-of-arm attachment adapted to install a dispense head on the container and remove the dispense head from the container, wherein the dispense head is capable of dispensing a liquid-based material from the container, the second exchangeable portion comprising a dispense head end-of-arm tool with a chassis, a servo drive receiver, a belt and pulley system, and a dispense head rotor.

2. The apparatus according to claim 1 wherein the first exchangeable portion comprises a first rotor comprising a plurality of clamps adapted to close about the cap such that torque may be applied to the cap by rotation of the first rotor.

3. The apparatus according to claim 1 wherein the second exchangeable portion comprises a second rotor engaged with the dispense head and capable of applying torque to the dispense head by rotation of the second rotor.

4. The apparatus according to claim 3 wherein the dispense head comprises three or more through-channels.

5. The apparatus according to claim 4 wherein at least one through-channel is connected to a Chemical Mechanical Polishing (CMP) tool.

6. The apparatus according to claim 3 wherein the dispense head comprises four or more through-channels.

7. The apparatus according to claim 6 wherein at least one through-channel is connected to a Chemical Mechanical Polishing (CMP) tool.

8. The apparatus according to claim 1 wherein the liquid-based material is a Chemical Mechanical Polishing (CMP) process chemical and wherein the CMP process chemical is dispensed to a CMP process tool.

9. The apparatus according to claim 1 wherein the fixed portion comprises a servo motor adapted to engage alternately with a first rotor of the first exchangeable portion such that the servo motor may apply torque to the first rotor and a second rotor of the second exchangeable portion such that the servo motor may apply torque to the second rotor.

10. The apparatus according to claim 9 additionally comprising a torque monitor to measure torque applied by the servo motor.

11. The apparatus according to claim 9 wherein the fixed portion additionally comprises a position monitor to measure rotational position of the servo motor.

12. The apparatus according to claim 1 wherein the fixed portion comprises one or more locks which, in a locked position, maintains the first exchangeable portion or the second exchangeable portion in a fixed position relative to the fixed portion, and which, in an open position, releases the first exchangeable portion or the second exchangeable portion.

13. The apparatus according to claim 1 wherein the fixed portion comprises one or more cameras capable of capturing an image of the container.

14. The apparatus according to claim 1 wherein the fixed portion comprises one or more range-finding detectors.

15. An apparatus according to claim 1, wherein the first exchangeable portion comprises a first rotor comprising a plurality of clamps adapted to close about the cap such that torque may be applied to the cap by rotation of the first rotor;
   wherein the second exchangeable portion comprises a second rotor comprising a dispense head such that torque may be applied to the dispense head by rotation of the second rotor;
   wherein the fixed portion comprises a servo motor adapted to engage alternately with the first rotor such that the servo motor may apply torque to the first rotor, and the second rotor such that the servo motor may apply torque to the second rotor, and wherein the apparatus comprises a torque monitor to measure torque applied by the servo motor;

wherein the fixed portion comprises one or more locks which, in a locked position, maintains the first exchangeable portion or the second exchangeable portion in a fixed position relative to the fixed portion, and which, in an open position, releases the first exchangeable portion or the second exchangeable portion; and wherein the fixed portion comprises one or more cameras and one or more range-finding detectors.

16. The apparatus according to claim 15 additionally comprising a programmable logic controller;

wherein the programmable logic controller is functionally connected to receive input from the torque monitor, the one or more cameras, and the one or more range-finding detectors; and wherein the programmable logic controller is functionally connected to control the motion of the robotic arm, the motion of the servo motor, and the motion of the one or more locks.

17. The apparatus according to claim 16 wherein the liquid-based material is a Chemical Mechanical Polishing (CMP) process chemical, wherein the CMP process chemical is dispensed to a CMP process tool, and wherein the programable logic controller is functionally connected to send status signals to the CMP tool.

18. A method comprising:

providing an apparatus for automated filling or dispensing of liquid-based materials from a container the apparatus comprising:

a robotic arm;

an end-of-arm attachment fixedly attached to the robotic arm, wherein the end-of-arm attachment comprises:

a fixed portion of the end-of-arm attachment fixedly attached to the robotic arm, the fixed portion comprising a universal head with a chassis, a servo motor, a servo drive adapter, guide pins, and locks;

the fixed portion being adapted to receive exchangeable portions of the end-of-arm attachment;

in a first configuration, a first exchangeable portion of the end-of-arm attachment adapted to remove a cap from a container, retain the cap, and reinstall the cap on the container, the first exchangeable portion comprising a shipping cap end-of-arm tool with a chassis, a servo drive receiver, a belt and pulley system, and a shipping cap rotor; and in a second configuration, a second exchangeable portion of the end-of-arm attachment adapted to install a dispense head on the container and remove the dispense head from the container, wherein the dispense head is capable of dispensing a liquid-based material from the container, the second exchangeable portion comprising a dispense head end-of-arm tool with a chassis, a servo drive receiver, a belt and pulley system, and a dispense head rotor, with the first exchangeable portion attached to the fixed portion, removing a cap from the container with the first exchangeable portion; and with the second exchangeable portion attached to the fixed portion, installing a dispense head on the container.

19. The method according to claim 18 additionally comprising:

dispensing a liquid-based material from the container through the dispense head.

20. The method according to claim 19 wherein the liquid-based material is a Chemical Mechanical Polishing (CMP) process chemical, the method additionally comprising:

supplying a portion of the dispensed CMP process chemical to a CMP process tool; and recirculating a portion of the dispensed CMP process chemical back into the container through the dispense head.

* * * * *